Patented June 7, 1949

2,472,590

UNITED STATES PATENT OFFICE 2,472,590

OXIDATION OF STARCH WITH NITROGEN DIOXIDE

William O. Kenyon and Cornelius C. Unruh, Rochester, N. Y., assignors to Eastman Kodak Company, Rochester, N. Y., a corporation of New Jersey No Drawing. Application March 2, 1945, Serial No. 580,735

6 Claims. (Cl. 260—209)

This application relates to the product resulting from the treatment of starch with $NO_2$ under such conditions that it is oxidized and to the method of preparing a starch so oxidized. Where the terms "$NO_2$" or "nitrogen dioxide" are used herein they are to be understood as including both $NO_2$ and its dimer $N_2O_4$.

It is often desirable in industrial procedures to have a material of high molecular weight or of a colloidal nature but which at the same time is soluble in water or in water which has been rendered slightly alkaline. In case of starch there have been many procedures mentioned resulting in soluble starch such as by acetylating that material. We have found, however, that starch may be rendered susceptible to a dissolving action of diluted alkalies by reacting thereon with $N_2O_4$ which imparts a carboxyl content to the starch. Therefore, it is an object of our invention to prepare an oxidized starch using $NO_2$ or $N_2O_4$ as the oxidizing agent which is readily susceptible to the dissolving action of diluted alkalies.

We have found that starch of various types may be subjected to the action of $NO_2$, and a product is obtained having a substantial carboxyl content and a low content of nitrogen. Ordinarily, commercial starch is a mixture of straight chain and branch chain molecules. We have found that it is immaterial whether or not the starch treated is made up of a mixture of straight chain and branch chain molecules or whether the starch consists substantially of one or the other of these types of structure. We have found that starches from various vegetable sources such as corn starch, tapioca, potato starch, wheat starch, rice starch, or as a matter of fact any type of starch is susceptible to treatment by $NO_2$ and will exhibit a carboxyl content so treated.

The oxidation process may be carried out in various ways. For instance if desired, the starch may be mixed with a solution of the $NO_2$ in an organic solvent. Solvents which have been found to be quite suitable for this purpose are the halogenated hydrocarbons. Other inert diluents, however, are useful in this connection such as hydrocarbons, such as benzene or toluene, chlorinated hydrocarbons, such as carbon tetrachloride, ethylene chloride, methylene chloride, or the like. If desired, the starch may be oxidized by treating it with gaseous $NO_2$, particularly when the starch particles are finely divided and are treated while in a condition in which they are readily susceptible to contact with the gas. For instance, oxidation of the starch with gaseous $NO_2$ occurs most readily when the starch is in a tumbling or agitating apparatus so that the particles of starch are all contacted with the gas with which they are treated. If desired, the starch may be treated directly with liquid $NO_2$, preferably accompanied by stirring and under enclosed conditions so as to assure good contact between the starch and the oxidizing material.

Ordinarily, in the oxidation of starch the time of treatment most suitable will be within the range of 1 to 6 hours, this being varied in accordance with the degree of oxidation desired and the conditions of temperature and concentration which are employed in the treatment. For instance, treating the starch with liquid $NO_2$ without dilution a time of 3 hours is ordinarily amply sufficient under the usual temperature conditions (65–75° F.). In those cases where the $NO_2$ is diluted with a liquid diluent, we have found that although the proportion of $NO_2$ therein is not critical, it is preferable that the amount of diluent used be at least equal to that of the $NO_2$ employed. In the treatment with the gaseous $NO_2$ it is ordinarily desirable to pass the gases through the starch chamber in order to assure homogeneity and the best uniformity of production which can be obtained under the conditions employed.

In the treatment of starch with $NO_2$ it is usually desirable that the amount of moisture present in the reaction chamber be reduced to a minimum. For instance, in the treatment it is desirable that the starch which is to be oxidized be fairly dry such as by drying in the air. If a product is desired which is soluble in very dilute alkali or ammonia (such as 1–2% sodium hydroxide), it is usually desirable that the oxidation be continued until the starch exihbits a carboxyl content of at least 12% although this point varies with different starches and different conditions. It is also desirable in such an operation that the treatment be imparted as uniformly as possible in order that a homogeneous product is obtained, and, therefore, if alkali solubility is desired, the entire mass be soluble therein. This is most readily accomplished by carrying out the treatment, especially in the case of gaseous $NO_2$, in a revolvable chamber having a dispersing-type action. It is also desirable when starch is treated with a liquid $NO_2$ oxidizer that the starch be circulated or moved in the liquid so as to assure a reasonable amount of oxidation of all of the starch particles present in the mass.

After the starch has been oxidized to the desired extent, the $NO_2$ is removed therefrom such as by air followed by washing with an inert liquid which will dissolve the $NO_2$ but will have no solvent effect upon the oxidized starch. It is also desirable in this operation that the starch be agitated or otherwise dispersed so as to assist in the isolation of the oxidized starch from the oxidant employed in its preparation. After isolating the oxidized starch it may be dried as such or it may be dissolved in a dilute alkaline solution and thereby be in a form for use where an aqueous solution of water dispersible colloid is desired.

The oxidized starch in accordance with our invention may be applied to gauze to prevent its adherence to body tissues, for instance, when used in cuts or wounds. The oxidized starch in accordance with our invention may be used as a substitute for pectins, alginic acid, or their salts in the preparation of foods or in food processing. It is also useful as a sizing for textile materials, such as to improve the adherence of basic dyes. In the form of heavy metal salts it is useful as a dye mordant on textiles. If desired, the oxidized starch may be added to emulsions, particularly those of gelatin in order to alter their viscosity. It may also be employed for backings or protective overcoatings for photographic film. Due to its solubility in alkaline solutions, these backings would be readily removable in the alkaline processing solutions to which such films would be subjected after having been exposed.

The following examples illustrate the preparation of oxidized starch in accordance with our invention:

*Example 1.*—400 cc. of liquid $N_2O_4$ were dissolved in 400 cc. of carbon tetrachloride and to the stirred solution so obtained 200 g. of corn starch were added in several portions. When all of the starch had been added, the mixture was stirred for a few minutes and was then allowed to stand for 6 hours at room temperature. The product was filtered off, aired to remove excess $N_2O_4$ vapors, and then leached in two fresh changes of methanol. The white granules were then placed in distilled water in which they swelled to a considerable extent. The distilled water was changed hourly until the washings were acid-free. The product was then immersed in two changes of methanol, followed by two changes in ethyl ether. The granules were filtered off and dried at room temperature. The resulting product was analyzed by well-known uronic acid determination method of Tollens and Lefevre and was found to have a carboxyl content of 22.4%. The product was also found to have a nitrogen content of 0.14%.

*Example 2.*—Twenty-five parts of corn starch were covered with a solution consisting of 50 parts of liquid $N_2O_4$ and 200 parts of carbon tetrachloride in a vessel which was stoppered loosely and shaken occasionally. After 4 hours the starch which had oxidized was filtered off, rinsed with fresh carbon tetrachloride, and placed in distilled water. The product was washed in successive changes of distilled water until the washings were acid free. The oxidized starch was then placed in two changes of methanol, followed by leaching in two changes of ether. It was then dried in vacuum at 60° C. The resulting product was analyzed for carboxyl by the uronic acid method and was found to have a carboxyl content of 17.5%. The nitrogen content was 0.17%.

*Example 3.*—Fifteen parts of corn starch were placed in a container and covered with a solution of 50 parts of $N_2O_4$ in 50 parts of carbon tetrachloride. This mass was agitated occasionally. After one hour the liquid was decanted from the product and the latter was rinsed in fresh carbon tetrachloride. The resulting product was then washed in distilled water and dried as described in the preceding example. Upon analysis the product was found to have a carboxyl content of 10.4% and a nitrogen content of .20%.

*Example 4.*—Twenty-five parts of corn starch were placed in a vessel and mixed therein with a solution of 50 parts of $N_2O_4$, dissolved in 100 parts of cyclohexane. The vessel was loosely closed and agitated occasionally. At the end of 4 hours the liquid was removed from the product and the product was washed with distilled water and dried. The resulting product was found to have a carboxyl content of 16.9% and a nitrogen content of .31%.

*Example 5.*—Twenty-five parts of corn starch were placed in a vessel and added thereto was a solution of 50 parts of liquid $N_2O_4$ in 100 parts of benzene. The mixture was stirred occasionally for 3 hours and then isolated and purified as described in Example 2. Analysis of the product showed a carboxyl content of 16.2% and a nitrogen content of 0.12%.

*Example 6.*—Five parts of water were cautiously added to 200 parts of a good grade of brown liquid $N_2O_4$. A dark green color was imparted to the liquid and this was set aside at 0° C. to allow the lower layer to settle. One-hundred parts of the upper layer were thoroughly mixed with 10 parts of corn starch and were allowed to stand with occasional agitation for 3½ hours. The starch was then isolated and purified as in Example 2. The product exhibited upon analysis a carboxyl content of approximately 20%, and nitrogen of 0.27%.

*Example 7.*—Ten parts of a fractionated tapioca starch consisting largely of the branched chain component known as "Amioca" were mixed with a solution of 40 parts of liquid $N_2O_4$ in 80 parts of carbon tetrachloride. The container was stoppered lightly and agitated occasionally, the product being treated for 6 hours. The resulting product was then separated from the liquid and purified as in Example 2. Analysis showed a carboxyl content of approximately 22%.

*Example 8.*—A constant, very slow current of $N_2O_4$ vapors was passed over a thin layer of 10 parts of corn starch for 16 hours at room temperature. The product was washed in distilled water as described in Example 2, then dried in vacuum at 60° C. Analysis showed a carboxyl content of 23.6% and a nitrogen content of 0.31%.

We claim:

1. $NO_2$-oxidized starch which is insoluble in water, free of non-uronic carboxyl groups and having a $CO_2$ equivalence of at least 12%.

2. $NO_2$-oxidized corn starch which is insoluble in water, substantially free from non-uronic carboxyl groups and has a $CO_2$ equivalence of at least 12%.

3. $NO_2$-oxidized tapioca starch which is insoluble in water, free of non-uronic carboxyl groups and has a $CO_2$ equivalence of at least 12%.

4. A method of preparing water-insoluble oxidized starch which comprises treating the starch with $NO_2$ for a sufficient time to impart a carboxyl content thereto of at least 12%, then washing the product with water and drying.

5. A method of preparing oxidized starch which comprises mixing the starch with a solution of $NO_2$ in a halogenated hydrocarbon for a time sufficient to impart a carboxyl content of at least 12% thereto, followed by washing with water and drying.

6. A method of preparing an oxidized starch which comprises treating the starch with $NO_2$ for one to six hours at room temperature, followed by washing the starch with water and drying.

WILLIAM O. KENYON.
CORNELIUS C. UNRUH.

REFERENCES CITED

The following references are of record in the file of this patent:

UNITED STATES PATENTS

| Number | Name | Date |
|---|---|---|
| 2,232,990 | Yackel et al. | Feb. 25, 1941 |

OTHER REFERENCES

"Manufacturing Chemist and Manufacturing Perfumer," July 1942, vol. XIII, pages 158–166.

"Industrial and Engineering Chemistry," vol. 34, No. 6, June 1942, pages 677–681.

Mench, Proc. Indiana Acad. of Sciences, vol. 55, 1946, pages 69 to 76, 8 pages. Reprint in Div. 6.)

Radley, Starch and Its Derivatives, Sec. ed. 1944, p. 183. (Copy in Div. 43.)

The Chemistry of Wheat Flour, Bailey, pages 202, 203, 208. (Copy in Div. 25, U. S. Patent Office, Washington, D. C.)